(12) United States Patent
Krah

(10) Patent No.: US 9,766,716 B2
(45) Date of Patent: *Sep. 19, 2017

(54) THREE-DIMENSIONAL IMAGING AND DISPLAY SYSTEM

(71) Applicant: APPLE INC., Houston, TX (US)

(72) Inventor: Christoph H. Krah, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 14/329,641

(22) Filed: Jul. 11, 2014

(65) Prior Publication Data

US 2014/0320414 A1 Oct. 30, 2014

Related U.S. Application Data

(60) Continuation of application No. 13/212,122, filed on Aug. 17, 2011, now Pat. No. 8,780,332, which is a
(Continued)

(51) Int. Cl.
G06F 3/03 (2006.01)
G01B 11/00 (2006.01)
G06F 3/00 (2006.01)
G06F 3/01 (2006.01)
G01C 3/08 (2006.01)
G01S 17/36 (2006.01)
(Continued)

(52) U.S. Cl.
CPC ............ *G06F 3/0325* (2013.01); *G01B 11/00* (2013.01); *G01C 3/085* (2013.01); *G01S 7/4817* (2013.01); *G01S 7/4861* (2013.01); *G01S 7/4865* (2013.01); *G01S 17/36* (2013.01); *G01S 17/48* (2013.01); *G01S 17/66* (2013.01); *G06F 3/005* (2013.01); *G06F 3/011* (2013.01); *G06F 3/012* (2013.01); *G06F 3/017* (2013.01); *G06F 3/02* (2013.01); *G06F 3/04815* (2013.01); *G06F 3/04886* (2013.01); *G01C 3/12* (2013.01); *G01S 17/105* (2013.01)

(58) Field of Classification Search
CPC . G01C 3/08; G01J 5/0215; G01J 5/025; G01J 5/0265; G01J 5/0275; G01J 5/08; G01J 5/0846; G01J 5/089; G01J 5/0896; G01J 5/02; G01J 2005/0077; G01S 17/46; H04N 5/332; H04N 5/2256; H04N 5/23293; H04N 5/33

See application file for complete search history.

(56) References Cited

U.S. PATENT DOCUMENTS 2,559,799 A 7/1951 Rinia
3,235,734 A 2/1966 Lozins
(Continued)

OTHER PUBLICATIONS http://tactiva.com/faq.html Frequently asked questions.
(Continued)

*Primary Examiner* — Luke Ratcliffe
(74) *Attorney, Agent, or Firm* — Blank Rome LLP

(57) ABSTRACT

A three-dimensional imaging and display system is provided in which user input is optically detected in an imaging volume by measuring the path length of an amplitude modulated scanning beam as a function of the phase shift thereof. Visual image user feedback concerning the detected user input is presented.

20 Claims, 8 Drawing Sheets

Related U.S. Application Data division of application No. 11/255,348, filed on Oct. 21, 2005, now Pat. No. 8,018,579.

(51) Int. Cl.

| | | |
|---|---|---|
| *G01S 17/48* | (2006.01) |
| *G01S 7/481* | (2006.01) |
| *G01S 7/486* | (2006.01) |
| *G01S 17/66* | (2006.01) |
| *G06F 3/02* | (2006.01) |
| *G06F 3/0481* | (2013.01) |
| *G06F 3/0488* | (2013.01) |
| *G01C 3/12* | (2006.01) |
| *G01S 17/10* | (2006.01) |

(56) References Cited

U.S. PATENT DOCUMENTS

| | | | |
|---|---|---|---|
| 3,443,870 A | | 5/1969 | Morgan |
| 3,480,368 A | | 11/1969 | Erf |
| 3,522,992 A | | 8/1970 | Jaffe |
| 3,824,595 A | | 7/1974 | Hall |
| 3,992,615 A | | 11/1976 | Bennett |
| 4,297,030 A | | 10/1981 | Chaborski |
| 4,567,347 A | | 1/1986 | Ito |
| 4,764,668 A | | 8/1988 | Hayard |
| 4,830,486 A | | 5/1989 | Goodwin |
| 5,168,531 A | | 12/1992 | Sigel |
| 5,321,353 A | * | 6/1994 | Furness .......... B25J 9/1697 318/568.11 |
| 5,390,024 A | | 2/1995 | Wright |
| 5,446,798 A | | 8/1995 | Morita |
| 5,452,034 A | | 9/1995 | Ichikawa |
| 5,487,669 A | | 1/1996 | Kelk |
| 5,655,033 A | | 8/1997 | Inoguchi |
| 5,691,725 A | | 11/1997 | Tanaka |
| 5,710,875 A | | 1/1998 | Harashima |
| 5,767,842 A | | 6/1998 | Korth |
| 5,831,719 A | | 11/1998 | Berg |
| 5,877,849 A | | 3/1999 | Ramer |
| 5,940,170 A | | 8/1999 | Berg |
| 6,115,114 A | | 9/2000 | Berg |
| 6,160,909 A | | 12/2000 | Melen |
| 6,192,145 B1 | | 2/2001 | Anandan |
| 6,205,241 B1 | | 3/2001 | Melen |
| 6,323,942 B1 | | 11/2001 | Bamji |
| 6,336,587 B1 | | 1/2002 | He |
| 6,483,595 B1 | | 11/2002 | Yakovlev |
| 6,512,838 B1 | | 1/2003 | Rafii |
| 6,710,770 B2 | | 3/2004 | Tomasi |
| 6,726,105 B2 | | 4/2004 | Patel |
| 6,750,960 B2 | | 6/2004 | Bowers |
| 6,765,393 B2 | | 7/2004 | Pierenkemper |
| 6,766,955 B2 | | 7/2004 | Patel |
| 6,824,058 B2 | | 11/2004 | Patel |
| 6,876,441 B2 | | 4/2005 | Barker |
| 6,876,775 B2 | | 4/2005 | Torunoglu |
| 6,906,793 B2 | | 6/2005 | Bamji |
| 6,917,415 B2 | | 7/2005 | Gogolla |
| 6,919,549 B2 | | 7/2005 | Bamji |
| 7,006,236 B2 | | 2/2006 | Tomasi |
| 7,050,177 B2 | | 5/2006 | Tomasi |
| 7,139,067 B2 | | 11/2006 | Pohle |
| 7,151,530 B2 | | 12/2006 | Roeber |
| 7,157,685 B2 | | 1/2007 | Bamji |
| 7,283,213 B2 | | 10/2007 | O'Connor |
| 7,307,661 B2 | | 12/2007 | Lieberman |
| 7,310,431 B2 | | 12/2007 | Gokturk |
| 7,340,077 B2 | | 3/2008 | Gokturk |
| 7,405,812 B1 | | 7/2008 | Bamji |
| 7,408,627 B2 | | 8/2008 | Bamji |
| 7,450,220 B2 | | 11/2008 | OConnor |
| 7,464,351 B2 | | 12/2008 | Bamji |
| 7,471,376 B2 | | 12/2008 | Bamji |
| 7,511,801 B1 | | 3/2009 | Rafii |
| 7,636,150 B1 | | 12/2009 | McCauley |
| 7,684,592 B2 | | 3/2010 | Paul |
| 7,692,625 B2 | | 4/2010 | Morrison |
| 7,719,662 B2 | | 5/2010 | Bamji |
| 7,755,613 B2 | | 7/2010 | Morrison |
| 7,787,134 B2 | | 8/2010 | Kohnen |
| 7,791,715 B1 | | 9/2010 | Bamji |
| 7,847,787 B1 | | 12/2010 | Boillot |
| 7,883,415 B2 | | 2/2011 | Larsen |
| 7,924,441 B1 | | 4/2011 | Milanovic |
| 8,018,579 B1 | | 9/2011 | Krah |
| 8,180,114 B2 | | 5/2012 | Nishihara |
| 8,234,578 B2 | | 7/2012 | Ferren |
| 8,417,058 B2 | | 4/2013 | Tardif |
| 8,427,657 B2 | | 4/2013 | Milanovic |
| 8,521,418 B2 | | 8/2013 | Ma |
| 8,743,345 B2 | | 6/2014 | Krah |
| 8,780,332 B2 | | 7/2014 | Krah |
| 2001/0012016 A1 | | 8/2001 | Ide |
| 2001/0046317 A1 | | 11/2001 | Kamon |
| 2002/0075240 A1 | | 6/2002 | Lieberman |
| 2003/0063775 A1 | | 4/2003 | Rafii |
| 2003/0174125 A1 | | 9/2003 | Torunoglu |
| 2003/0184729 A1 | | 10/2003 | Bowers |
| 2003/0223053 A1 | | 12/2003 | Liu |
| 2004/0046736 A1 | | 3/2004 | Pryor |
| 2004/0108990 A1 | | 6/2004 | Lieberman |
| 2005/0177054 A1 | | 8/2005 | Yi |
| 2008/0007709 A1 | | 1/2008 | Bamji |
| 2008/0246943 A1 | | 10/2008 | Kaufman |
| 2008/0259320 A1 | | 10/2008 | Kuerbitz |
| 2009/0010633 A1 | | 1/2009 | Strandemar |
| 2010/0214214 A1 | | 8/2010 | Corson |
| 2011/0102763 A1 | | 5/2011 | Brown |
| 2012/0062867 A1 | | 3/2012 | Shibatani |
| 2013/0287262 A1 | | 10/2013 | Blair |

OTHER PUBLICATIONS http://tactiva.com/immersive.html Reach inside your computer like it's part of the real world.
http://tactiva.com/tactapad.html TactaPad Interact with your computer in a direct and natural way. With the TactaPad you can reach into your computer and use both of your hands. Just like the real world.
http://tactiva.com/tactile.html Tactile feedback lets you feel what you're touching.
http://tactiva.com/twohanded.html Two hands are better than one.

* cited by examiner

THREE-DIMENSIONAL IMAGING AND DISPLAY SYSTEM

CROSS-REFERENCE TO RELATED APPLICATIONS

This application is a continuation application of U.S. patent application Ser. No. 13/212,122, filed on Aug. 17, 2011, entitled "Three Dimensional Imaging and Display System," now U.S. Pat. No. 8,780,332 which claims priority to Ser. No. 11/255,348, filed on Oct. 21, 2005, entitled "Three Dimensional Imaging and Display System," now U.S. Pat. No. 8,018,579 all of which are incorporated by reference herein in their entireties.

TECHNICAL FIELD

The present invention relates generally to imaging, and more particularly to a three-dimensional imaging and display system.

BACKGROUND ART

Modern three-dimensional ("3D") imaging and display technologies are employed in widely diverse environments and technologies. Examples include medical diagnostics, entertainment, flight simulation, robotics, education, animation, biomechanical studies, virtual reality, and so forth. There are numerous 3D input devices including, for example, variations on the computer mouse or touch pad. Ordinarily, these are manipulated in just two dimensions, the x-axis and the y-axis. However, through various computer programming artifices, these devices can provide a measure of control in the third dimension of the z-axis. In 3D, however, such constructs can be indirect, time consuming, artificial, and can require considerable practice and training to do well. Similar observations can be made relative to joysticks, which in their original function were designed for input on but two angles (dimensions). Other more sophisticated means of 3D input are therefore preferred.

One of the preferred methods of 3D input is passive input, wherein a device automatically detects and measures a target in 3D. A common technique for such 3D measurement uses the time of flight ("TOF") of a scanning light beam. The TOF technique measures the time or duration that lapses or accumulates from the moment of light pulse transmission to the moment of reception of the returning light pulse after reflection by a target object. The TOF is directly dependent on the distance the light pulse has traveled. TOF, however, requires very high-speed measuring equipment for accurate distance determination. Measurements at short distances can be inordinately difficult. Equipment costs and complexity are correspondingly high, making TOF unattractive for ordinary consumer applications.

Another 3D method for measuring distance utilizes light attenuation. Light attenuation is based upon the fact that, in general, the farther a light beam or light pulse travels, the dimmer the reflected light is when it returns. The difficulty with the light attenuation technique, however, is that different objects are more or less reflective, so the measurement is very dependent upon the reflectivity of the target object. One way to manage the reflectivity is to standardize it, for example, by attaching standardized target reflectors to the target object. Another method is to modulate the light beam and to compare the reflected signals at different light intensity levels. Both techniques, however, are inconvenient and unnecessarily complicated, as well as costly.

A need thus remains for uncomplicated, economical, yet highly effective 3D input devices for computers. Such devices need to be able to detect, analyze, and measure objects located in a 3D volume, and to observe and track any motions thereof. The devices should therefore be well suited and designed compatibly for use with 3D graphically intensive activities. They need to be capable of operating by optically sensing object or human positions, orientations, and/or motions. For reasons of cost as well as user convenience, they should be compact and capable of incorporation into a simple, small, single housing or unit. They also need to be versatile, and thus capable of working effectively and beneficially with the full range of conventional consumer appliances.

To be effective, it is also important that such devices be capable, when desired or necessary, of economically but effectively and precisely providing feedback to the user. Thus, such devices should incorporate audio and/or visual mechanisms for reporting to the user the effects and results of the 3D input. And again, for reasons of cost as well as user convenience, such devices should incorporate such user feedback functionality while continuing to be compact and capable of incorporation into a simple, small, single housing or unit.

Thus, a need still remains for economical, small, portable, and versatile multi-functional 3D imaging and display systems that can both scan and display simultaneously. A need also remains for such devices that provide integral, immediate feedback. A further need remains for such devices that are particularly well adapted for use with other, small electronic devices, particularly hand-held and other portable devices.

In view of the ever-increasing commercial competitive pressures, appliance sophistication, increasing consumer expectations, and diminishing opportunities for meaningful product differentiation in the marketplace, it is increasingly critical that answers be found to these problems. Moreover, the ever-increasing need to save costs, improve efficiencies, and meet such competitive pressures adds even greater urgency to the critical necessity that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a three-dimensional imaging and display system. User input is optically detected in an imaging volume by measuring the path length of an amplitude modulated scanning beam as a function of the phase shift thereof. Visual image user feedback concerning the detected user input is presented.

Certain embodiments of the invention have other advantages in addition to or in place of those mentioned above. The advantages will become apparent to those skilled in the art from a reading of the following detailed description when taken with reference to the accompanying drawings.

DETAILED DESCRIPTION OF EXEMPLARY EMBODIMENTS

Figure 1:
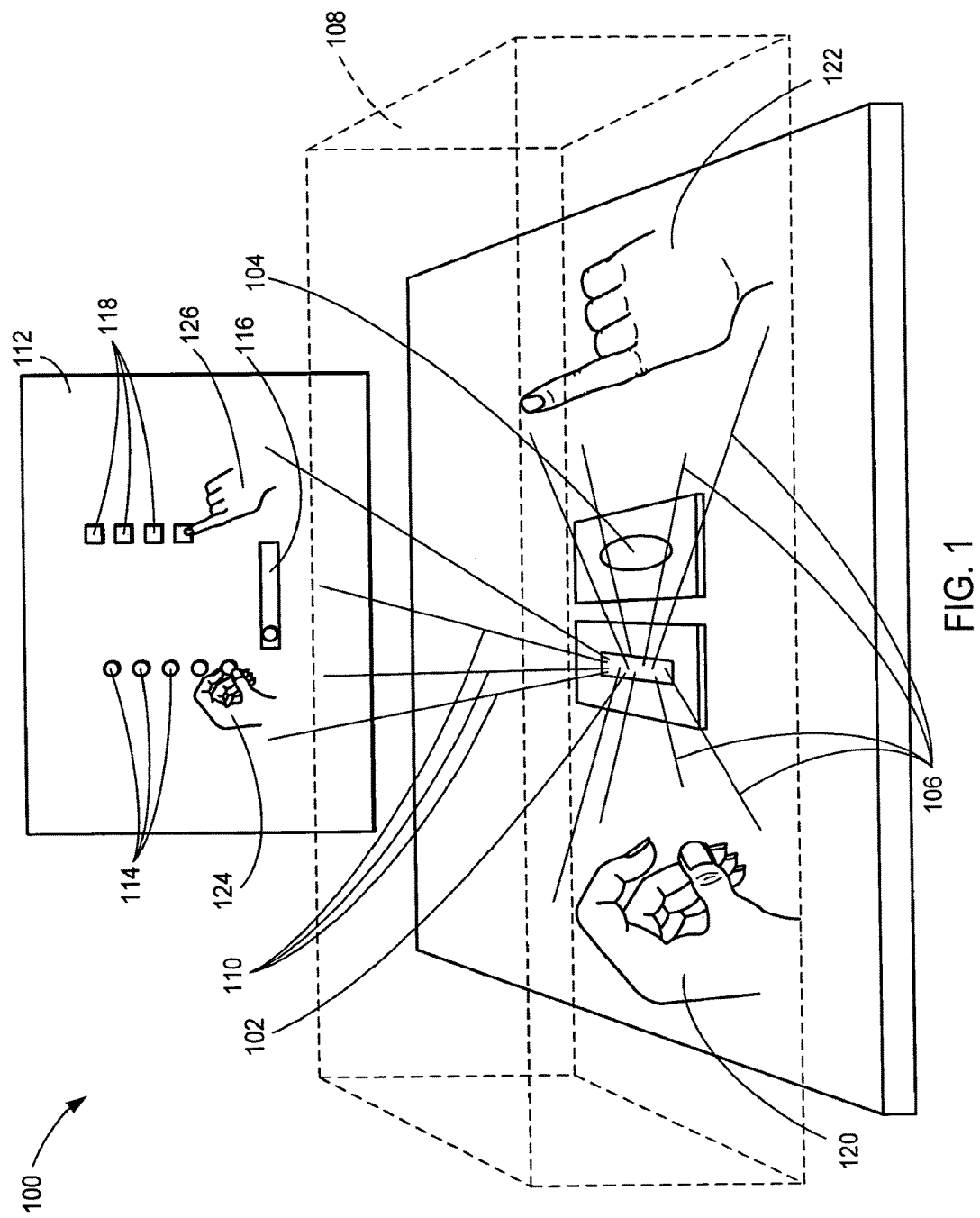
FIG. 1 is a view of an embodiment of a three-dimensional imaging and display system in accordance with the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and operational steps are not disclosed in detail.

Likewise, the drawings showing embodiments of the device are semi-diagrammatic and not to scale and, particularly, some of the dimensions are for the clarity of presentation and are shown greatly exaggerated in the drawing FIGS.

Similarly, the views in the drawings, for ease of description and understanding, show the device oriented in a certain manner with respect to the user. However, this illustration in the drawing FIGs. is arbitrary and is not intended to suggest that the device should necessarily be oriented in any particular direction. Generally, the device can be operated in any desired orientation.

Additionally, where multiple embodiments are disclosed and described having some features in common, for clarity and ease of illustration, description, and comprehension thereof, similar and like features one to another will ordinarily be described with like reference numerals.

The term "horizontal" as used herein is thus defined as a plane parallel to the visual plane of the particular person ("user") using the device, regardless of that person's actual orientation. Thus, for such a person standing upright, "horizontal" would be taken in its ordinary meaning as parallel to the horizon, but the term will be understood to follow changes in the user's orientation should that occur. The term "vertical" then refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

According to various embodiments of the present invention, three-dimensional ("3D") imaging apparatus are described suitable for head tracking, (hand) gesturing, presence detection, auxiliary display functions, and other capabilities and functionalities as set forth more particularly herewithin. In general, these involve combinations including an assortment of the following components:

A collimated high-speed infrared ("IR") or visible laser (e.g. such as used for fiber optic communications)
A visible 3-color illumination source and driver circuit
A high-speed photo detector (e.g., PIN diode based)
A digital signal processor ("DSP")
Dual axis scanning device (e.g., analog mirror) and driver circuit
Analog subsystem
Video subsystem Referring now to FIG. 1, therein is shown an embodiment 100 of a 3D imaging and display system in accordance with the present invention. The embodiment 100 includes a projector 102 and a receiver 104. The projector 102 projects a scanning beam 106 into an imaging volume 108. The projector 102 also projects a projection beam 110 onto a display area 112. In one embodiment, the projection beam 110 is utilized to project images onto the display area 112 of various virtual objects that are characterized as being virtually located within the imaging volume 108. These virtual objects may include, for example, knobs, sliders, buttons, and so forth. Images of these virtual objects are then projected by the projection beam 110 onto the display area 112, producing, for example, corresponding knob images 114, a slider image 116, and button images 118.

It will be understood, of course, that these virtual elements have no real physical embodiment, and thus do not actually appear in the imaging volume 108. Based upon the teachings herein, it will be also understood by one of ordinary skill in the art that, by using appropriate artifacts, the various virtual elements could actually be displayed within the imaging volume 108 itself. However, it is less complicated and more economical to project the images externally, such as described.

The imaging volume 108 is configured to enable a user to interact with the various virtual elements located virtually therein. Thus, a user would place his or her left hand 120 and/or right hand 122 into the imaging volume 108. The hands would then be detected by the scanning beam 106, as described more particularly hereinbelow. A left hand image 124 and a right hand image 126, respectively, would then be projected by the projection beam 110 onto the display area 112 to provide immediate feedback to the user concerning the relationship between the user's hands and the various virtual objects within the imaging volume 108. Thus, as depicted, the user can grasp one of the knob images 114 with the left hand 120 by moving the left hand 120 until the left hand image 124 indicates that the selected virtual knob (not shown) represented by the corresponding knob image 114 has been engaged. The knob can then be grasped and manipulated such as by rotating the knob.

Similarly, a virtual button (not shown), represented by the button images 118, may be pressed by appropriately positioning and moving the right hand 122, under the guidance of the feedback provided by the right hand image 126.

Accordingly, it will be understood that any virtual object can be grasped and manipulated within the virtual space of the imaging volume 108. Such objects, in addition to controls such as knobs, sliders, and buttons, can include virtually any kind of physical objects (e.g., a block of wood, a sheet of paper, hand tools, styli, virtual paint brushes, pencils, pens, grinders, knives, scissors, and so forth).

For the convenience and comfort of the user, the scanning beam 106 in one embodiment consists of an invisible (e.g., IR) light beam. The projection beam 110 is ordinarily in the visible light range, but could be invisible according to the application at hand. An example of the use of an invisible projection beam 110 would be, for example, the projection of an ultra-violet ("UV") beam onto a fluorescent target. The projection beam 110 may accordingly be mono- or polychromatic. In one embodiment, the projection beam 110 would be a red-green-blue ("RGB") beam that would be appropriately modulated, as is known in the projection sciences, to enable the presentation of full color images in the display area 112.

The receiver 104 receives light reflected from the scanning beam 106 by the user input, e.g., by the left hand 120 and by the right hand 122 of the user, as described in greater detail hereinbelow. This enables the system of the embodiment 100 to determine and display the exact configurations, positions, and movements of the physical objects (e.g. the left hand 120, the right hand 122, and so forth) introduced into and/or present within the imaging volume 108.

It will be understood, of course, that when the scanning beam 106 is not in the visible light range, it will not be expected to register true color information concerning the scanned object within the imaging volume 108. However, full color images can still be projected in the display area 112 utilizing, for example, pre-stored information concerning preferred color renditions for detected objects, according to their assigned configurations, and the various virtual objects, such as the virtual knobs, sliders, buttons, and so forth. Alternatively, complexity and costs can be reduced by utilizing monochromatic (e.g., gray scale) projection technologies in the projection beam 110.

In one embodiment, feedback to the user may also include sounds. For example, turning one of the knob images 114 may be accompanied by a clicking sound corresponding to certain arcs of rotation of the knob. Similarly, appropriate sounds may accompany the pressing of the button images 118, thereby providing the user with additional feedback and confirmation that the virtual object has been engaged and manipulated as desired.

Figure 2:
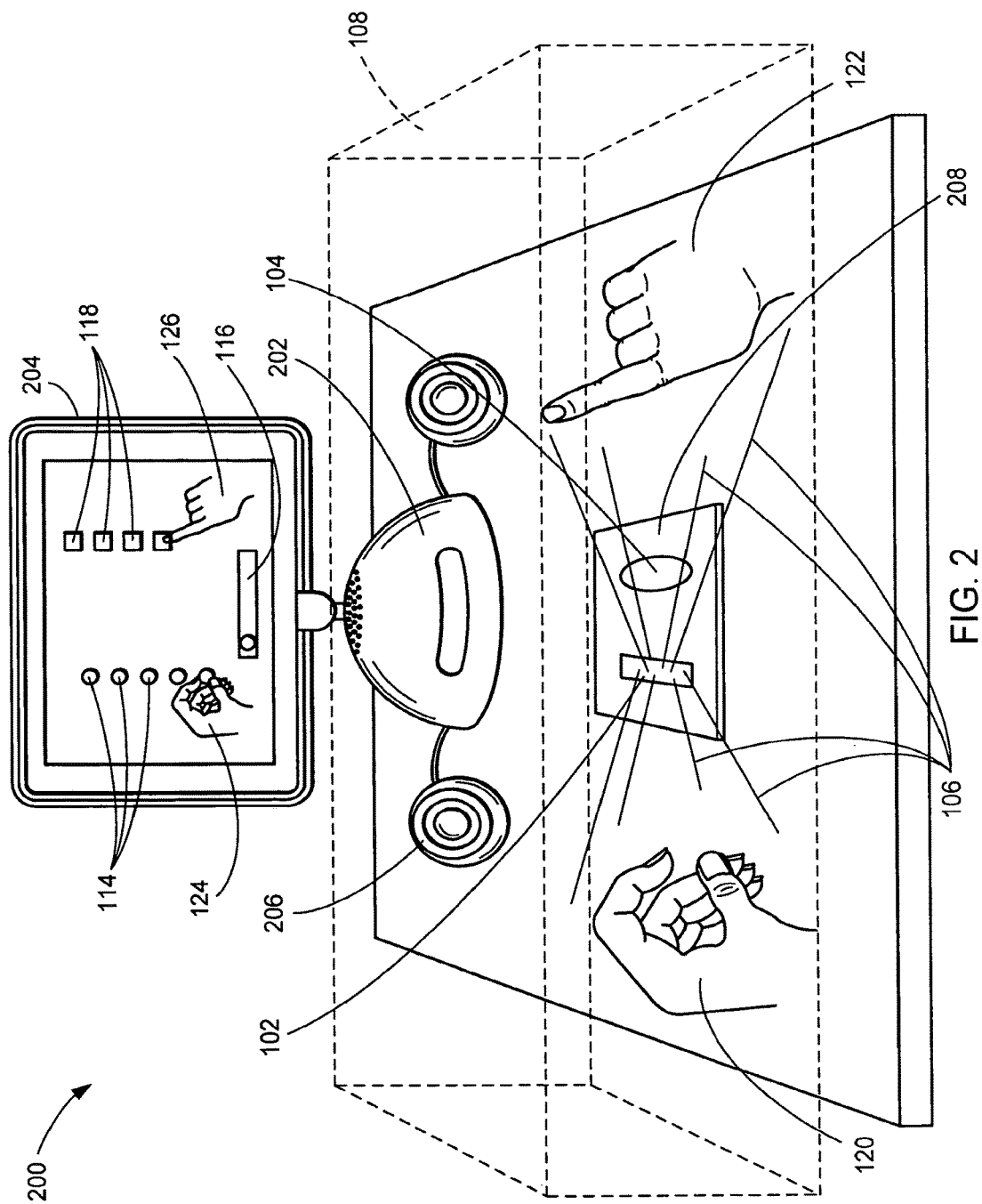
FIG. 2 is a view of another embodiment of a three-dimensional imaging and display system similar to the embodiment in FIG. 1.

Referring now to FIG. 2, therein is shown an embodiment 200 of a 3D imaging and display system similar to the embodiment 100 (FIG. 1). However, the embodiment 200 is designed and configured for use with a system capable of generating its own visual display. For example, the embodiment 200 is illustrated in use with a personal computer 202 having its own display 204, speakers 206, and so forth. Accordingly, the embodiment 200 does not need to incorporate a projection beam such as the projection beam 110 (FIG. 1) in the embodiment 100. In other words, the embodiment 100 can be seen as incorporating an imaging subsystem that operates in an imaging mode to detect objects within the imaging volume 108, and a display subsystem that operates in a display mode to display the various images on the display area 112 (FIG. 1). The embodiment 200 similarly incorporates the imaging subsystem, but does not need the complete display subsystem because it is able to command the external device, such as the personal computer 202, to generate the images. The embodiment 200 therefore needs only to provide appropriate image data, but does not need to actually project a projection beam such as the projection beam 110, in order to present visual image user feedback concerning the detected user input.

Advantageously, the video subsystem thus enables the 3D imaging and display system to function as and to provide an auxiliary display device for other electronic devices (e.g., music players) that may lack such a device, or to augment the displays on devices that do have some intrinsic display capability. As will be explained more particularly hereinbelow, the embodiment 100, for example, can then accept a standard analog RGB signal source and convert it to suitable drive signals for its internal projector 102 (e.g., an RGB laser subsystem), to display externally provided or generated images. A great versatility is thus afforded, presenting the user with the option to use the 3D imaging and display system simply and alone as an auxiliary display, or just as a 3D imager, or in a combination mode providing both the imaging and the display functions.

Another comparison of the embodiment 100 and the embodiment 200 shows that the projector 102 (FIG. 1) and the receiver 104 (FIG. 1) may be separate independent units, or may be combined into a single housing such as a housing 208 (FIG. 2).

The display area 112 may be a suitable projection canvas, a flat wall, or, for example, a transparent surface through which the image is projected from behind or onto which the image is projected from the front.

Figure 3:
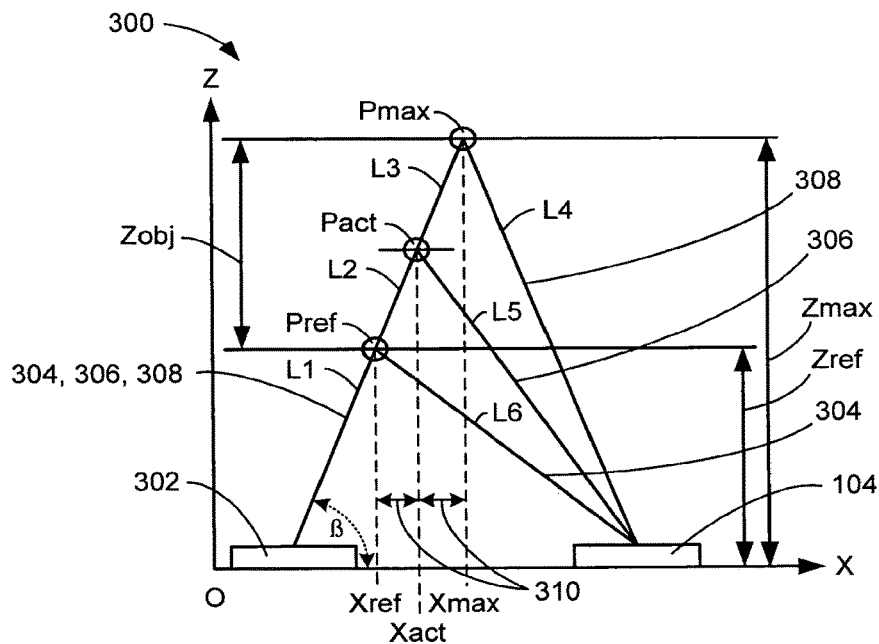
FIG. 3 is a graphical diagram depicting system calibration in accordance with the present invention.

Referring now to FIG. 3, therein is shown a graphical diagram 300 depicting system calibration. As will be described in greater detail hereinbelow, particularly with respect to FIG. 6, the projection beam 110 (FIG. 1) and the scanning beam 106 (FIG. 1) are moved to sweep their respective targets (the display area 112 (FIG. 1) and the imaging volume 108 (FIG. 1)), by a mirror system 302 contained within the projector 102 (FIG. 1). The mirror system 302 is configured to receive and reflect light beams projected onto it, and is controllably movable on at least two perpendicular axes so that the beams can be controllably projected and directed to any chosen and specified target. Thus, the projection beam 110 originates within the projector 102 (FIG. 1), is directed onto the mirror system 302 therein, and then swept across the display area 112. Similarly, the scanning beam 106 originates within the projector 102 and then is controllably swept through the imaging volume 108 in response to the specified mirror deflection controls and commands.

For better results, it is desirable to calibrate the 3D imaging and display system. When the system includes the projection beam 110, the projection beam 110 can be easily adjusted by the user similarly as any well-known projector is adjusted. However, accurate detection of objects within the imaging volume 108 by the scanning beam 106 is preferably provided by a more careful calibration method and protocol. Therefore, one such imaging calibration procedure will now be described.

For ease of understanding and comprehension, the underlying principles of the imaging calibration will first be disclosed in the two-dimensional ("XZ") environment depicted in FIG. 3. Then, in FIG. 4, this disclosure and explanation will be extended to the full three dimensions of the imaging volume 108.

Since the scanning beam 106 that is reflected by the mirror system 302 is not perpendicular to the object to be imaged, the Z-axis ("Z") data needs to be error corrected and remapped to the proper X-axis and Y-axis ("XY") coordinate, due to parallax. FIG. 3 shows the light path for three light paths 304, 306, and 308 in the XZ plane. The light paths 304, 306, and 308 are made up of segments L1 through L6. The light path 304 comprises segments L1 and L6; the light path 306 comprises segments L1, L2, and L5; and the light path 308 comprises segments L1, L2, L3, and L4.

Embodiments of 3D imaging and display systems according to the present invention (e.g., the embodiment 100 or the embodiment 200) will ordinarily have a DSP (not shown, but see the DSP 718 in FIG. 7) for data processing and system control. Generally, the DSP will map a mirror angle (FIG. 3) for a given light path length to a corresponding X coordinate. However, the effective or actual X coordinate depends on the distance Z between the object and the sensor plane (e.g., the XY plane). That is, for the same angle β, different target object distances in the Z dimension will not only have different light path lengths, but will also correspond to different X coordinates. These X coordinate differences are the parallax 310 that is being compensated.

For example, consider a target object that is at point Pref. In this scenario, the angle would be mapped to location coordinates Xref and Zref. The latter would be calculated based on β and the length of the light path 304, namely, L1+L6. Similarly, if the target object is at point Pmax, the angle β would be mapped to location Xmax and Zmax. The latter would be calculated based on β and the path length L=L1+L2+L3+L4. Like determinations can be made for any points along the line of angle β. If, for a given implementation, the distance Zref is the minimum distance, and Zmax is the maximum distance, the 3D imaging and display system of the present invention can then detect any object between the XY planes located at Zref and Zmax. Furthermore, if all points Pref(X,Z,β) and Pmax(X,Z,β) are known, then any points Pact(X,Z,β) between the Zref plane and the Zmax plane can be properly mapped to their respective X,Z coordinates by interpolation between Pref(X,Z,β) and Pmax (X,Z,β).

Accordingly, during factory calibration all points Pref(X, Zref,β) and Pmax(X,Zmax,β) are stored in a read-only memory ("ROM") lookup table (for instance, associated with the DSP 718) having parallax compensation calibration information therein. Then, when an object is scanned, a mapping engine (for example, in the DSP 718) maps object point data by interpolation between Pref(X,Zref,β) and Pmax(X,Zmax,β) to the actual locations X and Z. The mapping is performed utilizing the returned path length L for a given angle β, generated by operation of the mirror system 302 and the scanning beam 106 (as further explained below).

As will now be explained, this process is then implemented and expanded in a similar fashion to include the Y dimension or coordinate as well.

Figure 4:
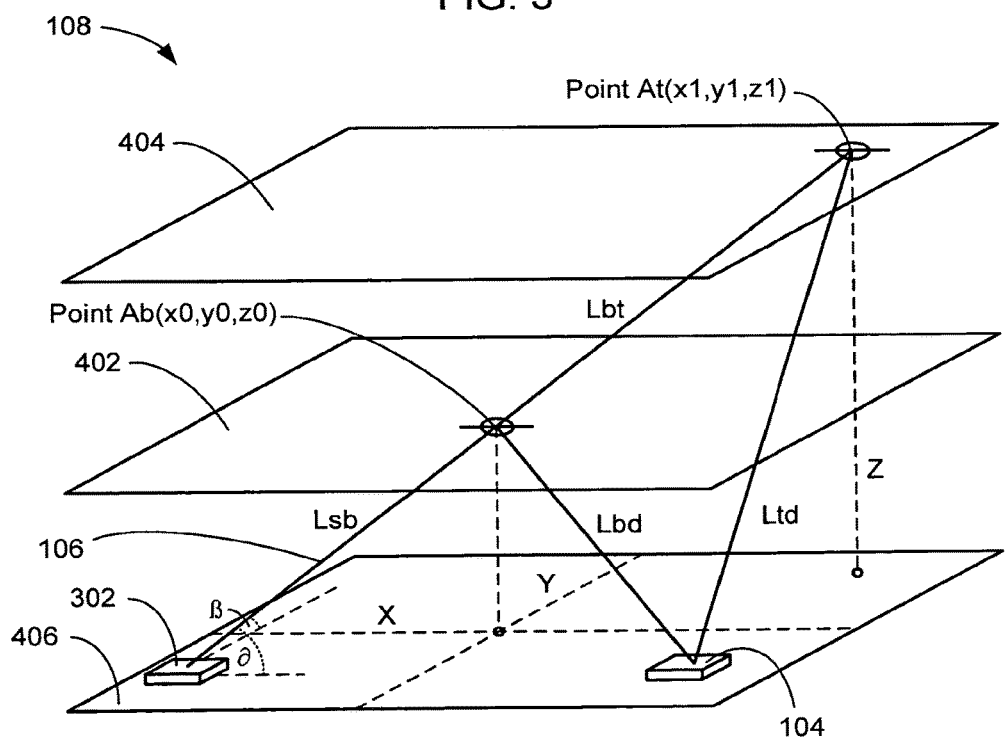
FIG. 4 is an illustration of a calibration, detection, and measurement procedure, according to an embodiment of the present invention.

Referring now to FIG. 4, therein is shown a like calibration, detection, and measurement procedure, according to an embodiment of the present invention, for mapping an object located in the imaging volume 108 (FIG. 1) to the proper (X, Y, Z) 3D coordinates. For the imaging apparatus to acquire proper (X, Y, Z) coordinates, a calibration is first performed. The calibration enables the accurate mapping of an object in the imaging volume 108 to the proper (X, Y, Z) coordinates.

In one embodiment, the imaging volume 108 is divided into three equidistant imaging planes, a bottom reference plane 402, a top reference plane 404, and a sensor plane 406. The mirror system 302 (in the projector 102 (FIG. 1)) and the receiver 104 are located in the sensor plane 406. The bottom reference plane 402, the top reference plane 404, and the sensor plane 406 are parallel to each other.

All the planes are subdivided into a grid of rectangular zones. Each zone is mapped to an (X, Y, Z) coordinate.

During calibration, each (X, Y, Z) coordinate is mapped to an angular displacement $(\partial,\beta)$ and a phase shift $\phi(\partial,\beta)$, where $\partial$ is the angle between the X-axis of the sensor plane 406 and the scanning beam 106 (FIG. 1), and is the angle between the Y-axis of the sensor plane 406 and the scanning beam 106. The phase shift $\phi(\partial,\beta)$, as explained further hereinbelow, is directly proportional to the path length of the scanning beam 106 from the mirror system 302 to the target object and back to the receiver 104.

The calibration measurement results are stored in eight lookup tables:

| | |
|---|---|
| $xb(\partial, \beta)$ | $xt(\partial, \beta)$ |
| $yb(\partial, \beta)$ | $yt(\partial, \beta)$ |
| $zb(\partial, \beta)$ | $zt(\partial, \beta)$ |
| $\phi b(\partial, \beta)$ | $\phi t(\partial, \beta)$ |

Figure 7:
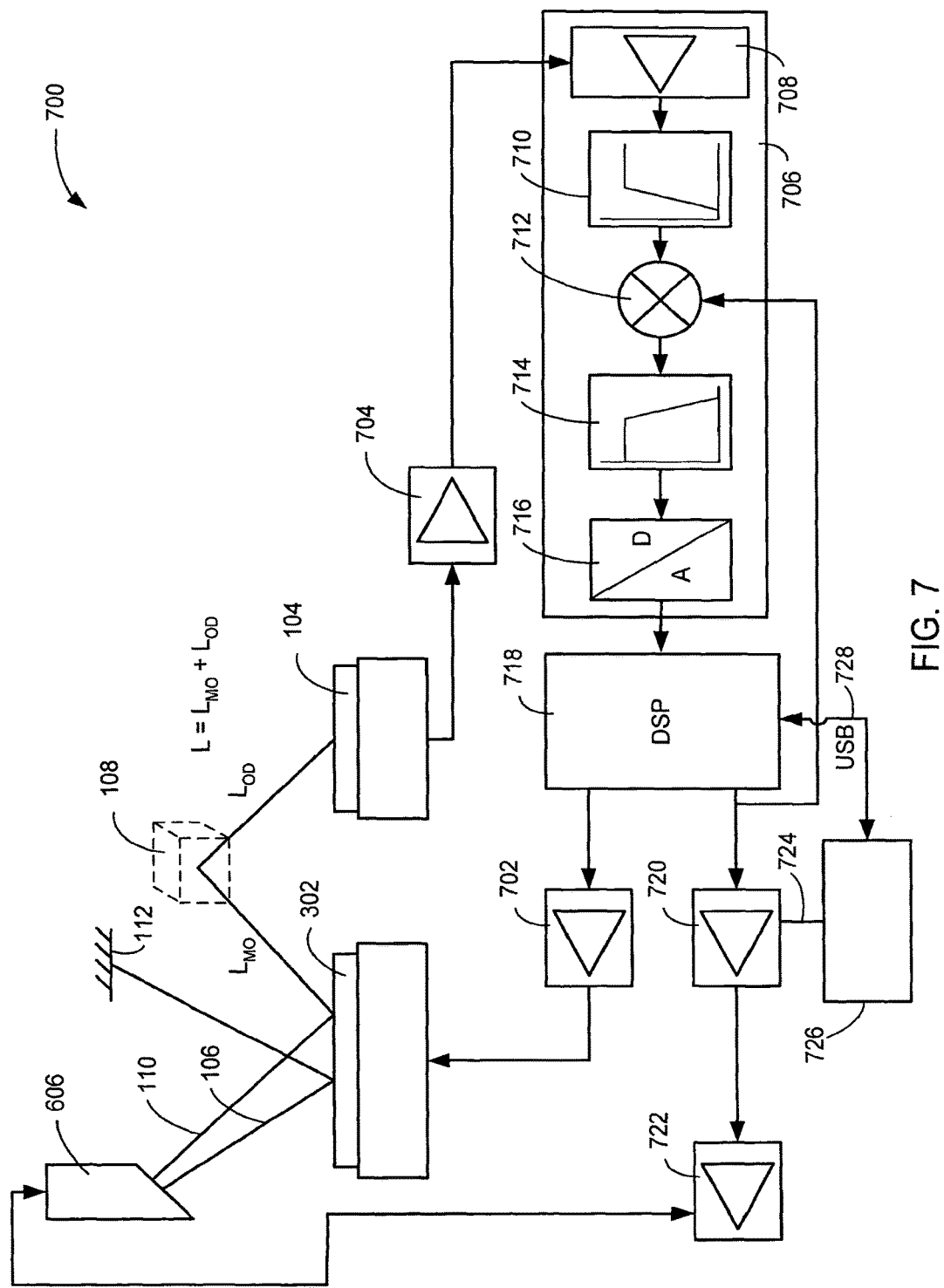
FIG. 7 is a block diagram of an embodiment of the three-dimensional imaging and display system according to the present invention.

Each lookup table contains n×m values, wherein $\partial=1$ to n and $\partial=1$ to m. In one embodiment, the deflection angles are represented by integer numbers to ease processing in a DSP, such as the DSP 718 (FIG. 7). For example, an angle of 0 degrees may be represented by the number zero, and an angle of 180 degrees may be represented by a number of 255 (8-bit value) and so on.

Following generation of the calibration data in this manner, each illumination angle $\partial$ and β can then be properly mapped to the (x, y, z) coordinates through the phase shift parameter φ as follows (where φ, again, is proportional to the path length of the scanning beam 106).

For a given angular displacement $(\partial,\beta)$, the phase shift $\phi(\partial,\beta)$ is measured (as explained further hereinbelow) and an interpolation coefficient $s(\partial,\beta)$ is specified:

$$s(\partial,\beta)=(\phi t(\partial,\beta)-\phi(\partial,\beta)/(\partial,\beta)-\phi b(\partial,\beta)) \quad \text{(Equation 1)}$$

The interpolation coefficient s(a,B) is then used to calculate the actual (x, y, z) coordinate of the target object, through interpolation, as follows:

$$x=s(\partial,\beta)*(xt(\partial,\beta)-xb(\partial,-\beta))+xb(\partial,\beta) \quad \text{(Equation 2)}$$

$$y=s(\partial,\beta)*(yt(\partial,\beta)-yb(\partial,-\beta))+yb(\partial,\beta) \quad \text{(Equation 3)}$$

$$z=s(\partial,\beta)*(zt(\partial,\beta)-zb(\partial,-\beta))+zb(\partial,\beta) \quad \text{(Equation 4)}$$

With this explanation, it will now be understood that the calibration procedure in one embodiment (continuing to refer to FIG. 4) is performed as follows:

1. The bottom reference plane 402 is installed, in the sense that target objects, or an entire planar target sheet, are provided in order to reflect the scanning beam 106.
2. The deflection angle $(\partial,\beta)$ of the scanning beam 106 is adjusted to target a selected target object (e.g., Point Ab(x0,y0,z0), etc.) in the bottom reference plane 402, the scanning beam 106 exiting the mirror system 302 at the deflection angle $(\partial,\beta)$.
3. x0, y0, z0 and L0 are determined, where:
   the coordinate (x0,y0,z0) is the location at which the scanning beam 106 is reflected from the bottom reference plane 402; and
   L0 is the distance the scanning beam 106 travels from the mirror system 302 to the target object point Ab(x0,y0,z0) and then to the receiver 104. I.e., L0=Lsb+Lbd.
4. Values for x0, y0, z0 and L0 are saved in a lookup table for later retrieval.
5. Steps 2 to 4 are repeated for all other deflection angles.
6. The bottom reference plane 402 is uninstalled.

7. The top reference plane 404 is installed, in the sense that target objects, or an entire planar target sheet, are provided in order to reflect the scanning beam 106.
8. The deflection angle (∂,β) of the scanning beam 106 is adjusted to target a selected target object (e.g., Point At(x1,y1,z1), etc.) in the top reference plane 404, the scanning beam 106 exiting the mirror system 302 at the deflection angle (∂,β).
9. x1, y1, z1 and L1 are determined, where: the coordinate (x1,y1,z1) is the location at which the scanning beam 106 is reflected from the top reference plane 404; and L1 is the distance the scanning beam 106 travels from the mirror system 302 to the target object point At(x1,y1,z1) and then to the receiver 104. I.e., L1=Lsb+Lbt+Ltd.
10. Values for x1, y1, z1 and L1 are saved in a lookup table for later retrieval.
11. Steps 8 to 10 are repeated for all other deflection angles.
12. The top reference plane 404 is uninstalled, concluding the calibration procedure.

Figure 5:
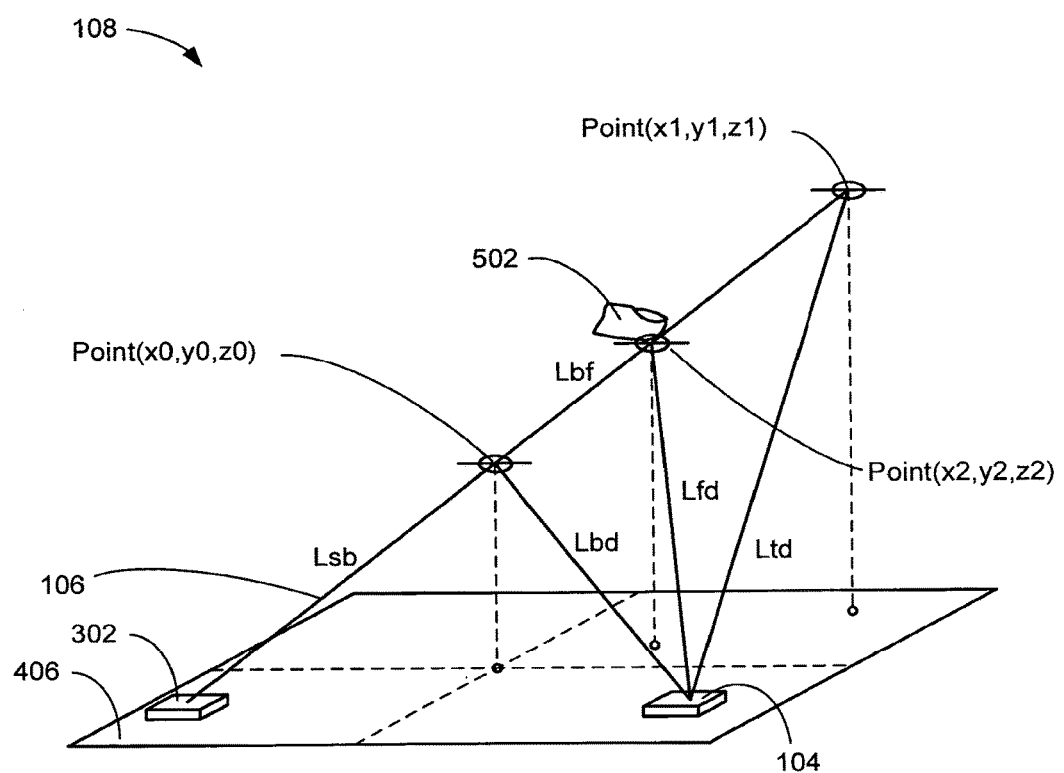
FIG. 5 is an illustration depicting the detection of an object.

Referring now to FIG. 5, therein is shown an illustration, similar to FIG. 4, of the imaging volume 108 following calibration as described. In FIG. 5, an example is depicted of the detection of an object, for example a finger 502, in the imaging volume 108.

As shown in FIG. 5, the finger 502 causes a reflection of the scanning beam 106 at Point(x2,y2,z2) for deflection angle (∂,β), so the actual coordinates x2, y2, z2 then need to be determined. In this example, x2 is between x0 and x1, y2 is between y0 and y1, and z2 is between z0 and z1. Because, for a given angular displacement (∂,β), the values for x0, x1, y0, y1, z0, z1, L0, and L1 are known, the coordinates of Point(x2,y2,z2) can be calculated from L2, where L2 is the distance the scanning beam 106 travels between the mirror system 302, the finger 502, and the receiver 104. That is, L2=Lsb+Lbf+Lfd.

As depicted in FIG. 5, the finger 502 is located at the halfway point between Point(x0,y0,z0) and Point(x1,y1,z1), meaning that the interpolation coefficient is 0.5, based on Equation 1. By applying Equations 2 to 4, the coordinates of Point(x2,y2,z2) are determined to be (x0+x1)/2, (y0+y1)/2 and (z0+z1)/2, respectively. The correct coordinate position of the finger 502 has thus been determined, and the same determination can similarly be made for any other target object.

Figure 6:
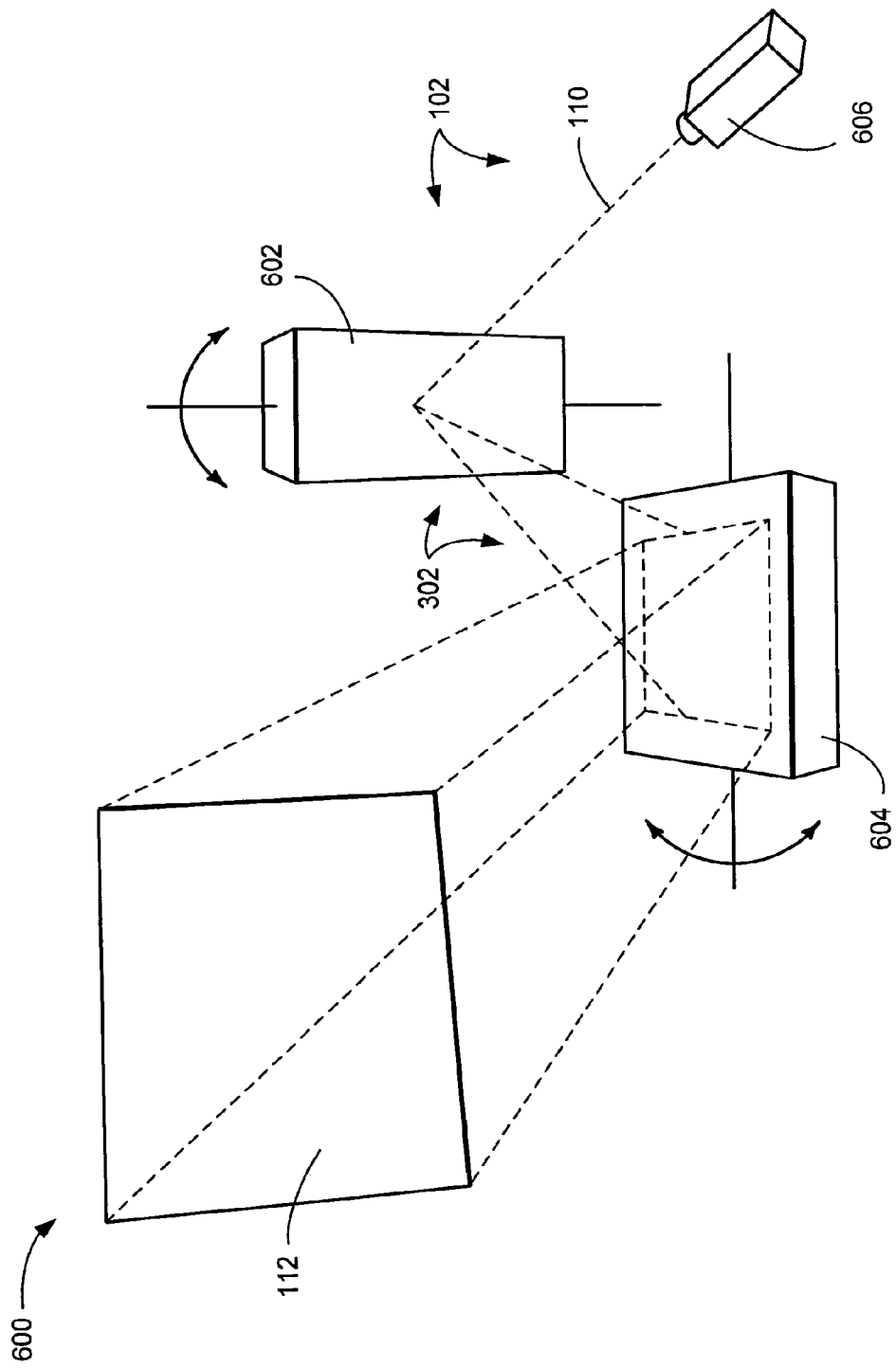
FIG. 6 is a schematic of a mirror system according to an embodiment of the present invention.

Referring now to FIG. 6, therein is shown a schematic 600 of the mirror system 302 according to an embodiment of the present invention. For clarity of illustration, the schematic 600 shows only the projection portion of the 3D imaging and display system according to the present invention. It will be readily understood, however, that the same mirror system 302, in embodiments of the invention such as the embodiment 100 (FIG. 1), will be used simultaneously for both the projection beam 110 and the scanning beam 106 (FIG. 1), as illustrated and described hereinbelow in FIG. 7. For example, when the mirror system is used for both the projection beam 110 and the scanning beam 106, the projection beam 110 and the scanning beam 106 are alternately generated and the mirror system 302 synchronized therewith. On the other hand, in embodiments of the invention such as the embodiment 200 (FIG. 2), the mirror system 302 is used for the scanning beam 106 alone.

The mirror system 302 may be, for example, a commercially available high-speed scanning mirror system employing, for example, two mirrors that are controllably positionable respectively on perpendicular axes to provide for reflecting a light beam in any desired direction within the sweep range of the mirror system 302. Such mirrors, intended for example for laser projection displays, imaging, barcode scanning, and so forth, are commercially available from such companies as Texas Instruments, Inc., Dallas, Tex.

The mirror system 302 includes a horizontal mirror 602 and a vertical mirror 604. In one embodiment, the horizontal mirror 602 and the vertical mirror 604 are then oscillated in a raster-scanning mode to project an RGB light beam from a laser 606 (in the projector 102 (FIG. 1)) onto the display area 112. In one embodiment, the horizontal mirror 602 and the vertical mirror 604 are oscillated at their natural or resonant frequencies of vibration for greater efficiency and precision of control. In one embodiment, the horizontal mirror 602 is a high-frequency mirror, and the vertical mirror 604 is a low-frequency mirror.

Referring now to FIG. 7, therein is shown a block diagram 700 of the embodiment 100 (FIG. 1) of the 3D imaging and display system according to the present invention. It will be understood, based upon the present description, that other embodiments can be readily configured by suitable modifications hereof. One example, for instance, is the embodiment 200 (FIG. 2) in which the projection beam 110 (FIG. 1) and associated RGB light sources can be eliminated from the block diagram 700 when a separate display, such as the display 204 (FIG. 2), is available.

The system of the block diagram 700 includes the laser 606. In one embodiment, the laser 606 includes an IR laser light source that generates the scanning beam 106, and an RGB projection source that generates the projection beam 110 in the three primary red ("R"), green ("G"), and blue ("B") colors. The RGB light source may be laser, LED, or other appropriate light generators according to the application at hand, and it will therefore be understood that the use of the term "laser" for the laser 606 is intended inclusively of such light sources, not exclusively.

The system of the block diagram 700 also includes the mirror system 302 that is controlled and driven by a mirror driver 702. The mirror driver 702, in one embodiment, consists of digital circuitry that generates control and drive signals for the mirror system 302 that are synchronized to the horizontal and vertical synchronization pulses generated by the DSP 718.

The receiver 104, in one embodiment, is a very sensitive detector connected to a photodiode amplifier 704. It is important that the detection for the scanning beam 106 is very sensitive because the scanning beam 106 travels a reasonable distance in comparison with its initial power, and incurs substantial scattering when it hits a target object. For reasons of economy, and in some circumstances for reasons of safety, the scanning beam 106 is not initially very powerful. Also, the ambient environment typically includes a great deal of light noise, not the least of which is the pervasive 50 or 60 Hz light modulation generated by artificial illumination.

Prior to striking a target object, of course, a laser beam will typically remain collimated and focused, but it is widely scattered after it strikes a target object. The laser signal, which will be described in greater detail hereinbelow, is therefore expected to be weak by the time it reaches the receiver 104, perhaps as little as only several microwatts.

Figure 10:
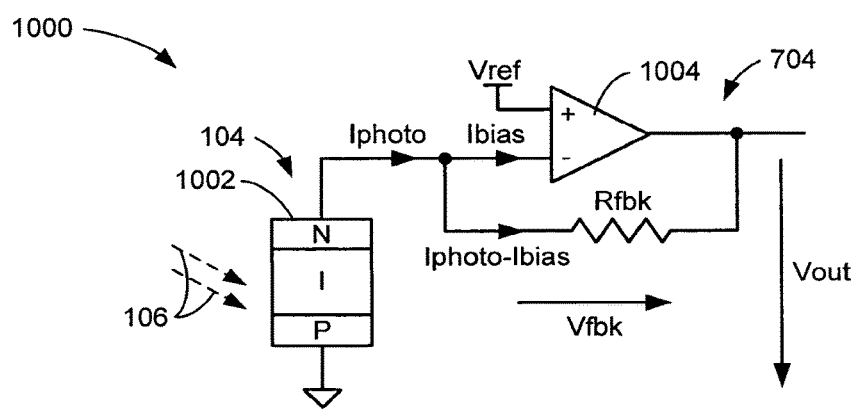
FIG. 10 is a schematic diagram of portions of a sensor circuit in accordance with the present invention.

To be able to detect the returning scanning beam 106 and separate it from the other light noise also impinging upon the receiver 104, the receiver 104 incorporates a PIN diode detector (not shown, but see the PIN diode detector 1002 in FIG. 10). ("PIN" refers to a three-layer configuration comprised of p-doped silicon, intrinsic (undoped) silicon, and n-doped silicon.) The photodiode amplifier 704 is a very high-speed operational amplifier ("OP AMP") that amplifies the signals coming from the PIN diode detector in the receiver 104.

The output from the photodiode amplifier 704 goes to an analog subsystem 706. Within the analog subsystem 706 is a clip amp 708 that receives the output from the photodiode amplifier 704.

The output from the photodiode amplifier 704, in one embodiment, is a sine wave signal. The clip amp 708 is utilized to convert the sine wave into a rectangular waveform by amplifying and clipping the signal. This effectively functions as an A/D converter ("ADC"), simplifying subsequent signal analysis inasmuch as the signal of interest is not the amplitude, but rather the frequency and the phase shift thereof.

The output from the clip amp 708 goes to a high pass filter 710 that preconditions the signal, as described further hereinbelow, before it is fed into a mixer 712.

The mixer 712 is a homodyne mixer that mixes signals of the same frequency but of different phases. In particular, the mixer 712 mixes the signal coming from the receiver 104 with the signal that is used to modulate the scanning beam 106 (as further described hereinbelow). Thus, the mixer 712 homodyne mixes the modulation frequency of the scanning beam 106 with the returned and phase-shifted (or phase-offset) scanning signal coming from the receiver 104.

The output from the mixer 712 is passed to a low pass filter 714 that essentially removes all of the frequency components of higher frequencies coming from the mixer 712, in order to provide an output that is the difference signal ("f") between the two mixed signals. The difference signal f would be zero at a frequency of 0 Hz, because the frequencies are the same. At any other frequency there will also be a term at twice the frequency. Thus, before processing the phase-shift signal, the low pass filter 714 is used to remove that double frequency component, as well as any other higher frequency components, thereby isolating the phase-shift offset.

The output from the low pass filter 714 is then passed to an ADC 716. The signal received by the ADC 716 from the low pass filter 714 is related to the phase shift, or phase offset, of the scanning beam 106 received by the receiver 104. This phase offset signal is thus a distance signal indicating the distance that the scanning beam 106 has traveled. The ADC 716 then converts this distance signal into digital form in preparation for passing it to a DSP 718.

The DSP 718 processes the distance information (the phase offset). By knowing the position of the mirror system 302 and the calibration information as described above in connection with FIGS. 3-5, the DSP 718 is able to derive from the phase offset the distance (i.e., path length) that the scanning beam 106 has traveled and to generate an output defining the positions of all the objects detected in the imaging volume 108. The DSP 718 knows the position of the mirror system 302 because it controls the mirror driver 702 that, in turn, drives the mirror system 302. The DSP 718 also generates a modulation signal for the laser 606, for example, for the projection beam 110. That information, in turn, is used to control a driver 722 for the laser 606. Control can also be provided for the laser that generates the scanning beam 106.

Additionally, a video subsystem 720 may include other inputs such as, for example, an analog RGB input 724. The analog RGB input 724 may be used, for example, to receive display information for projection of externally provided images onto the display area 112 from an external device such as an external host system 726. Examples of such an external host system 726, for example, include personal music players, personal data assistants ("PDAs"), and so forth, that could also be connected to the DSP 718 through a link 728, such as a USB connection.

In order to measure the distance that the scanning beam 106 travels from the projector 102 (FIG. 1) to the target object (e.g., the finger 502 (FIG. 5)), and back to the receiver 104, the scanning beam 106 is modulated. The modulation is preferably amplitude modulation, although it will be understood that other forms of modulation (e.g. frequency modulation) may be employed as well according to the needs or desired configurations for the circumstances at hand. The modulation makes it unnecessary to employ sensitive, high-speed, and expensive circuitry for making time of flight ("TOF") measurements. Instead, in one embodiment, a suitable modulation frequency for the amplitude of the light beam is selected, and then the shift in the phase of that modulation is detected by the 3D imaging and display system, as just described above. The phase shift or phase lag of the amplitude modulated light beam is then detected, and this directly yields the distance that the scanning beam 106 has traveled.

More particularly, the scanning beam 106 from the laser 606 is amplitude modulated with a signal of the form:

$$V_{MOD}(t)=V_M \cdot \sin(\omega_M \cdot t)+V_{OFF\_MOD} \quad \text{(Equation 5)}$$

where: $V_m$ is the amplitude of the dynamic portion of the modulation signal, and $V_{off\_mod}$ is the offset of the modulation signal.

The collimated and modulated laser beam is projected onto an analog mirror. That is, the laser 606 generates the scanning beam 106, which is amplitude modulated and is projected onto the mirror system 302. The mirror system 302 deflects the modulated scanning beam 106 to a virtual plane that, in one embodiment, is parallel to the work surface. The virtual plane would be a plane in which, for example, the finger 502 is located. The object to be imaged (e.g., the finger 502) is in the virtual plane and reflects the laser light. A high-speed (e.g., a PIN diode based) photo detector, such as in the receiver 104, picks up the reflected laser light. Assuming that only the reflected laser light enters the receiver 104, the signal coming out of the receiver 104 has the form:

$$V_{DET}(t)=V_D \cdot \sin(\omega_M \cdot t\phi)+V_{OFF\_DET} \quad \text{(Equation 6)}$$

where: $V_D$ is the amplitude of the dynamic portion of the detected signal, and $V_{OFF\_DET}$ is the offset of the detected signal.

The frequency of the detector signal from the receiver 104 will be the same as the frequency of the modulation signal, but will be phase shifted by $\phi$ in respect to the frequency of the modulation signal.

The phase shift $\phi$ is caused by the path delay, i.e. the time it takes for the light to travel from the projector 102 to the receiver 104. This means that $\phi$ is a function of the distance between the 3D imaging and display system and the object point that is being imaged. The phase shift can be determined or calculated by first calculating the wavelength $\lambda$ of the modulation signal of the frequency $f_{mod}$ in free space:

$$c = \lambda \cdot f_{mod} \rightarrow \lambda = \frac{c}{f_{mod}} \quad \text{(Equation 7)}$$

The phase shift can be expressed as follows:

$$\phi = \frac{360 \cdot L}{\lambda} \qquad \text{(Equation 8)}$$

Where: L is the path length from the laser 606 in the projector 102 to the receiver 104.

By combining (Equation 7) and (Equation 8) we obtain:

$$\phi = \frac{360 \cdot f_{mod} \cdot L}{c} \qquad \text{(Equation 9)}$$

$V_{DET}(t)$ is amplified by the clip amp 708 so that the amplitude of $V_{DET}(t)$ becomes $V_M$.

To combat non-synchronous noise on the sensor signal in the receiver 104, and to convert the phase-shift $\phi$ into an analog voltage, the offsets $V_{OFF\_MOD}$ and $V_{OFF\_DET}$ are removed from $V_{MOD}(t)$ and $V_{DET}(t)$, by means of the high pass filter 710, whose cut-off frequency is just below the frequency of the modulation signal. Making the high pass filter 710 cutoff as close to the modulation frequency as possible helps to filter out low-frequency noise that may be present on the sensor signal from the receiver 104.

$V_{DET}(t)$ and $V_{MOD}(t)$ are then mixed. I.e.:

$$V_{OUT}(t) = V_M^2 \cdot \sin(\omega_M \cdot t) \cdot \sin(\omega_M \cdot t + \phi) = \qquad \text{(Equation 10)}$$

$$\frac{V_M^2}{2} \cdot (\sin((\omega_M - \omega_M) \cdot t - \phi) +$$

$$\sin((\omega_M + \omega_M) \cdot t + \phi) \ldots ) =$$

$$\frac{V_M^2}{2} (\sin(\phi) + \sin(2 \cdot \omega_M - \phi) \ldots )$$

The output spectrum of the resultant signal $V_{OUT}(t)$ contains the difference frequencies and the sum frequencies of the original signals, amongst others. Therefore, one component will be DC and another will be twice the modulation frequency. Accordingly, in the following step, the output of the mixer 712 is filtered in the low pass filter 714 to remove the high-frequency component(s) and isolate the DC component. System performance can be improved by properly selecting the cut-off frequency of the low pass filter 714 according to the operating parameters that have been selected.

The low pass filter cut off frequency is dependent on the maximum sampling rate and the number of pixels that need to be imaged. The following condition is preferably met:

$$f_{mod} > f_c > f_{SAMPLE} \cdot N_{PIXELS} \qquad \text{(Equation 11)}$$

where: $f_{SAMPLE}$ is the cutoff frequency of the low pass filter 714, $f_{SAMPLE}$ is the frame rate (e.g. 125 Hz), and $N_{PIXELS}$ is the number of pixels in the image.

After low pass filtering, the output signal $V_{OUT}$ has the form:

$$V_{OUT}(\phi) = \frac{V_M^2}{2} \cdot \sin(-\phi) \qquad \text{(Equation 12)}$$

Note that $V_{OUT}$ is now a function of the phase shift, not time.

This signal $V_{OUT}$ is fed into the ADC 716 and then passed to the DSP 718 for further processing.

With (Equation 12) the phase shift can now be calculated. From (Equation 12) we obtain:

$$\phi(V_{OUT}) = -\arcsin\left(2 \cdot \frac{V_{OUT}}{V_M^2}\right) \qquad \text{(Equation 13)}$$

Alternately, from (Equation 13) the path length L could be calculated as follows, using (Equation 9):

$$L(V_{OUT}) = -\frac{c}{360 \cdot f_{MOD}} \cdot \arcsin\left(2 \cdot \frac{V_{OUT}}{V_M^2}\right) \qquad \text{(Equation 14)}$$

The DSP 718 applies either (Equation 13) or (Equation 14) to obtain the phase shift 0 or the path length L as a function of the signal $V_{OUT}$, respectively.

One way for modulating the amplitude of the scanning beam 106 is to modulate the output intensity of the laser in the laser 606 that generates the scanning beam 106. This modulation can be effected, for example, by modulating the driver power for the laser 606.

Figure 11:
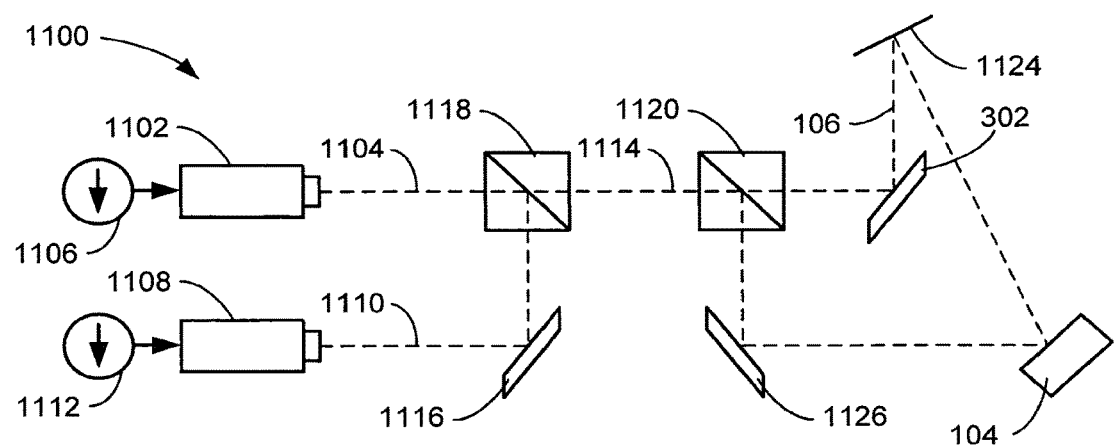
FIG. 11 is a block diagram of a dual laser modulation-demodulation configuration in accordance with the present invention.

Another method and configuration for generating an amplitude modulated scanning beam 106 is to use two lasers that are at slightly different frequencies with respect to one another and then superimposing the laser beams, thereby generating a beat or interference pattern amplitude modulation. Such an interference configuration, as described more particularly below with respect to FIG. 11, provides a very economical means to achieve a very high modulation frequency, thereby providing a very high granularity for much greater precision and detail recognition and definition.

Figure 8:
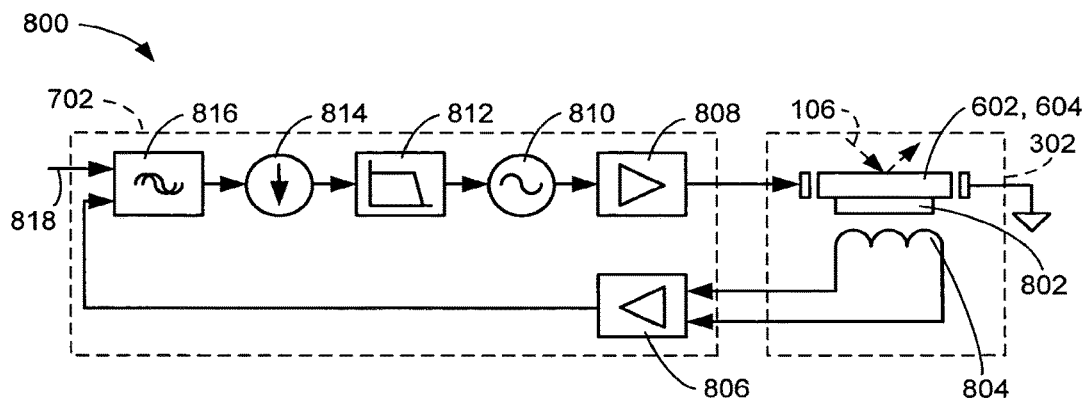
FIG. 8 is a block diagram of the mirror subsystem of the present invention.

Referring now to FIG. 8, therein is shown a block diagram of the mirror subsystem 800 of the 3D imaging and display system of the present invention. The mirror subsystem 800 includes, in part, the mirror driver 702 and the mirror system 302. The mirror system 302 includes the horizontal mirror 602, the vertical mirror 604, respective magnets 802 thereon, and corresponding respective pick-up coils 804 adjacent the magnets 802.

The mirror driver 702 includes a differential amplifier 806 connected to the pick-up coils 804, a driver 808 connected to drive the mirrors 602 and 604 in the mirror system 302, a voltage controlled oscillator ("VCO") 810 that is connected to the driver 808, a loop filter 812 that is connected to the VCO 810, a charge pump 814 that is connected to the loop filter 812, and a phase comparator 816 that is connected to the charge pump 814 and receives inputs from the differential amplifier 806 and a sync pulse line 818.

The VCO 810 sets the frequency of the drive signal for the mirror system 302. The voltage amplitude of the drive signal determines the respective displacement angles of the horizontal mirror 602 and the vertical mirror 604, and thus the horizontal and vertical displacements of the projected scanning beam 106.

The magnets 802 that are attached to the horizontal and vertical mirrors 602 and 604 induce respective voltages in their respective pick-up coils 804. This voltage is proportional to the angular displacements of the mirrors. The displacement voltages are amplified by the differential amplifier 806 and then compared to the phase of the incoming synchronization signal on the sync pulse line 818 by the phase comparator 816. The phase comparator 816, in combination with the charge pump 814 and the loop filter 812, generates an error correction signal that is fed into the VCO 810. By this means, the synchronization signal on the sync pulse line 818 is kept in phase with the mirror drive signal from the driver 808.

The mirrors of the mirror system 302 each have their own resonant frequency that is set by the properties of the mirror driver 702 (e.g., a Piezo material) and the proof mass of the mirror, mirror driver, and magnets 802. The composite system can be compared to a crystal that operates best at its characteristic resonant frequency. Similarly, the proof mass of the mirror system 302 and the suspension of the mirror assembly can be compared to a spring and mass system that also has a characteristic resonant frequency. According to the teachings of the present invention, these are the frequencies preferably selected for operation of the horizontal mirror 602 and the vertical mirror 604.

Figure 9:
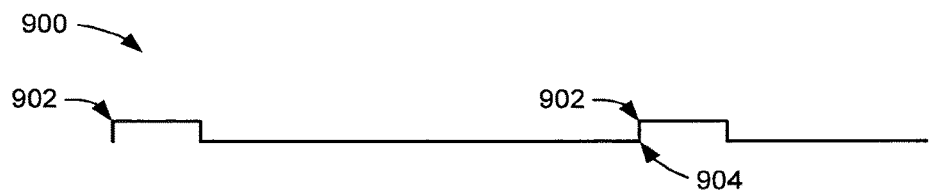
FIG. 9 is a view of an exemplary sync pulse for the horizontal mirror in FIG. 6.

Referring now to FIG. 9, therein is shown an exemplary sync pulse 900 for the horizontal mirror 602 (FIG. 6). The rising edge 902 of the sync pulse 900, for example, will correspond to one edge (e.g., the left edge) of the scanning range, and the end 904 of the sync pulse 900, prior to the next rising edge 902, will correspond to the opposite (e.g., right) edge of the scanning range.

Referring now to FIG. 10, therein is shown a schematic diagram of portions of a sensor circuit 1000 of the present invention. The sensor circuit 1000 includes the receiver 104 and the photodiode amplifier 704. The front end of the sensor circuit 1000 is a PIN diode 1002 which is comprised of three layers: a P-layer (p-doped semiconductor) ("P"), an N-layer (n-doped semiconductor) ("N"), and an intrinsic layer (non-doped semiconductor) ("I"). The intrinsic layer is sandwiched between the N-layer and the P-layer. The non-inverting input of an OP AMP 1004 is biased to a reference voltage Vref which appears on the inverting output of the OP AMP 1004 and reverse biases the PIN diode 1002. Any light that enters the intrinsic layer of the PIN diode 1002 creates electron-hole pairs in the intrinsic layer. Due to Vref, an electric field is present across the intrinsic layer, which will separate the electron-hole pairs, causing a photocurrent Iphoto to flow into the inverting input of the OP AMP 1004. To maximize the sensitivity of the sensor circuit 1000, Ibias should be much smaller than Iphoto, and Rfbk and Vfbk should be large.

Referring now to FIG. 11, therein is shown a block diagram 1100 of a dual laser modulation-demodulation configuration. The configuration in the block diagram 1100 generates an amplitude modulated laser beam for the scanning beam 106 that utilizes an optical system for modulating the beam intensity that can provide better resolution due to the much higher modulation frequency that can be easily, efficiently and inexpensively obtained. In particular, the amplitude modulation takes advantage of the fact that the frequency of the light emitted by a laser is a function of the threshold current. A laser 1102 generates a beam 1104 with frequency f1. The frequency f1 is set by a constant current source 1106. Similarly, a laser 1108 generates a beam 1110 with frequency f2, set by a constant current source 1112. The beams 1104 and 1110 are combined into a beam 1114 using a mirror 1116 and a beam splitter 1118.

Because the beam 1104 and the beam 1110 have different frequencies, the intensity of the resulting beam 1114 is modulated with an interference or beat frequency pattern whose frequency is the difference between the frequencies of the two beams 1104 and 1110.

The beam 1114 is split in a beam splitter 1120 and a portion of the beam 1114 is then reflected by the mirror system 302 to a target object 1124. Some of the light from the beam 1114 that is reflected by the target object 1124 then reaches and is detected by the receiver 104.

Another portion of the beam 1114 from the beam splitter 1120 is routed by a mirror 1126 to the receiver 104 where it is homodyned with the reflected light from the target object 1124. Due to the differences in the path lengths of the portions of the beam 1114 exiting from the beam splitter 1120, the light reflecting from the target object 1124 will be phase-shifted with respect to the light that comes from the mirror 1126. This phase shift is a direct measure of the distance of the target object 1124, as described more particularly hereinabove. Also as previously described, the homodyned light signal will contain a high-frequency component that is the sum of the frequencies of the beam 1104 and the beam 1110, and will also contain a DC component. The DC component is a function of the phase shift between the homodyned beams received in the receiver 104, and is then isolated from the higher frequency components by means of the low pass filter 714 (FIG. 7) having an appropriately low cut off frequency.

It has been unexpectedly discovered that the present invention has enormous versatility and value. An important utility and value of the invention resides particularly and unexpectedly in the great range of useful applications in which the invention can be exploited, as well as in the great range of devices with which the invention can be advantageously allied and employed. It has thus been discovered that the present invention can be advantageously, economically, and efficiently employed to extend the range of capabilities of numerous existing devices, as well as to afford entirely new functionalities in new applications and environments.

For example, the 3D imaging and display system can be used for applications such as the following:

Head Tracking. In one embodiment, for example, the 3D imaging and display system would create and store several calibration images of a user's head at different horizontal and vertical angles. Then, during active use, the 3D imaging and display system would image the user's head in the imaging volume 108 and map the image of the user's head to a vertical and horizontal tilt angle by correlating the acquired image with the calibration images. The tilt angle then could be mapped to human interface related functions such as scrolling or zooming For example, in one implementation, the head tilt angle would be mapped to a zoom function (e.g., a magnifier glass) on the screen. In yet another application, a motorized camera would follow the user's head movement, and so forth.

Hand Gesturing. In one embodiment, for example, the 3D imaging and display system would use watershed analysis to detect elements of a user's hand(s) and track individual and relative movements and positions of the hand(s) and the detected elements thereof. For example, the elements would be the fingers, thumb, palm, and so forth. Then, the detected hand gestures would be mapped to interface related functions such as 3D rotate, zoom, scroll, volume control, etc. According to the immediate application and needs, this could be in addition to, or independent of, the manipulation of virtual objects in the imaging volume 108 as described above.

User Presence Detection. In another embodiment, for example, the 3D imaging and display system would be used to detect whether a user is sitting in front of a display. This information may be used, for example, to identify which user is present. It may also be used, for example, to shut the system down and thereby save power when the user is away.

Perform Display and 3D Imaging Functions in Combination. This application has generally been discussed earlier above. It can be extended to provide simultaneous display functionality that would be additional to and independent of the display of the user activity within the imaging volume 108.

Auxiliary Display. In another embodiment, for example, the 3D imaging and display system would be used to provide an auxiliary display for an externally connected device, such as a personal computer.

Use In Combination With Small Devices As An Auxiliary Display. This is an extension of the previous use to devices which have no, or only a rudimentary, display device. In such an embodiment, for example, the 3D imaging and display system would be used with a personal music player, a personal data assistant ("PDA"), and so forth, to provide primary or extended display capability, thereby considerably enhancing the usability of the device, and substantially enhancing and improving the user experience.

Surveillance. The small size, low cost, and high discrimination capability of the present invention give it unique advantages in surveillance situations.

Bar Code Reader. Traditional bar code readers typically lack economical integral display functionality. Instead, either a rudimentary dot matrix number display is provided, or an entirely separate display device must be utilized. The present invention economically and efficiently overcomes these prior limitations.

Object Measuring. The high precision yet compact form factor, portability, and low cost of the present invention lend it uniquely to many applications where dimensions, locations, speeds, trajectories, item counts (e.g., prescription pill dispensing), and so forth are needed.

Image Substitution/Replacement. An object is scanned and stored in memory (e.g., stored in or in association with the DSP 718). Image recognition procedures residing on the DSP 718 are then used to detect the object via the 3D imaging portions of the system, and then replace the object in real time with a predetermined object in the display, such as in the display area 112. For example, the user may place a cylindrical object on his/her table. The system would then pick up this image and associate it to a predetermined or pre-assigned object and function. For example, this associated object could be a volume knob and the associated function could be a volume control. Then, whenever the user turned the cylindrical object—i.e., turned the "knob", the associated object would rotate in the display area and adjust the system volume.

"Painting" A Moveable Object, and Following It As It Moves. In one embodiment, the 3D imaging and display device could be used to draw 3D images. For example, the user could place a finger at a specific location within the imaging volume 108, which location then could be selected by the user as the vertex of a 3D shape. Similarly, the user could then select other vertices to complete the 3D shape. Both hands could be used to perform point and selection functions. For example, the index finger of the left hand 120 could be used to point to certain locations inside the imaging volume 108, while the index finger of the right hand 122 could be used to select those locations as vertices (e.g., by pressing a virtual button corresponding to a button image 118). During all these operations, the auxiliary display function would be providing immediate feedback. The right hand 122 could also be used to select other functions, such as filling the 3D shape with a certain color or manipulating the shape by moving the vertices, or rotating or relocating (displacing) the shape, and so forth.

Virtual Keyboard. Some devices, for example some PDAs, lack keyboards. The present invention can solve that insufficiency by generating an interactive virtual keyboard by detecting finger locations and movements, responding accordingly thereto, and, when desired, projecting an associated virtual keyboard image.

Automatic Function Assignment. By detecting which kind of object(s) (a hand, foot, head, etc.) are optically detected from the user input in the imaging volume 108, the 3D imaging and display system can associate a predetermined function or set of functions with at least some of those objects.

It will be understood, of course, that the above and earlier-described exemplary applications for the 3D imaging and display system of the present invention can be used independently of one another, or used cumulatively and simultaneously according to the needs and desires of the user and the particular applications and implementations at hand. Also, the components and circuit elements disclosed hereinabove, particularly those in the block diagram 700 (FIG. 7), constitute structure (e.g., measuring structure) and circuitry for performing the various functions and activities described herein.

Figure 12:
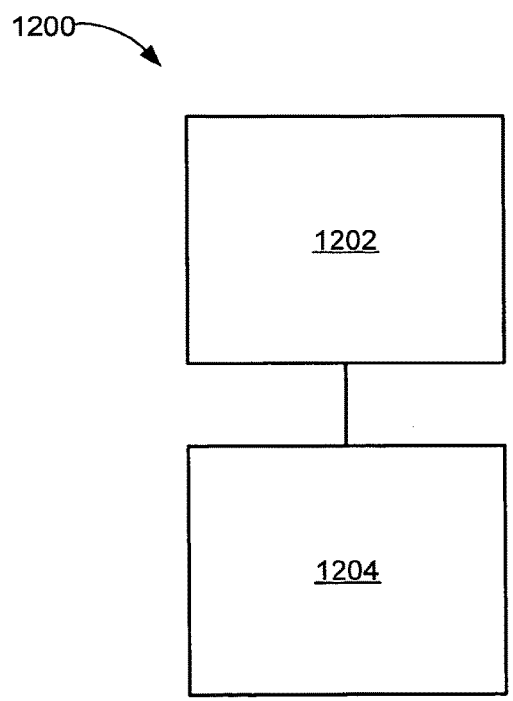
FIG. 12 is a flow chart of a three-dimensional imaging and display system in accordance with an embodiment of the present invention.

Referring now to FIG. 12, therein is shown a flow chart of a system 1200 for a three-dimensional imaging and display system in accordance with an embodiment of the present invention. The system 1200 includes optically detecting user input in an imaging volume by measuring the path length of an amplitude modulated scanning beam as a function of the phase shift thereof, in a block 1202; and presenting visual image user feedback concerning the detected user input, in a block 1204.

It has been discovered that the present invention thus has numerous advantages.

A principle advantage is that the present invention combines highly effective and accurate 3D imaging and display functions in a single device that can be economically manufactured.

Another advantage of the present invention is that it can be easily utilized with the widest range of existing and future devices, for extending the capabilities thereof.

Another advantage is that it can be implemented in a small, compact form factor, thereby rendering it unobtrusive, portable, and energy efficient.

Another advantage is that its use is unobtrusive as well. That is, no special artifacts, such as specially attached reflection points, are needed on the target object(s).

Another advantage is that it requires no supporting wires or batteries for the objects that are moved by the user. In contrast, for example, a typical computer mouse requires one or the other.

Yet another advantage of the present invention is that it in fact eliminates not only cable clutter, but device clutter as well, since all controlled devices can be virtual.

Still another advantage of the present invention is that it is fully "plug-n-play", requiring minimal or no configuration by the end user.

Another important advantage is that the present invention provides for complete customization. Thus, a user can easily choose display properties such as button colors, interface devices (buttons vs. sliders, or both, for example). The user can also readily customize the environment in which the three-dimensional imaging and display system is deployed. Such environmental customization could include, for example, configuring the imaging volume 108 to the user's needs or preferences such as, for example, the user's body size and position, and so forth.

Yet another advantage of the present invention is that it is highly versatile, affording highly effective 3D imaging functions that enable a multitude of functions, such as but not limited to, head tracking, user presence detection, advanced 3D gesturing, and auxiliary display functions.

Another advantage is that the present invention extends beyond the capabilities of traditional imagers, such as complementary metal oxide semiconductor ("CMOS") video cameras, that do not provide the depth performance of the 3D imaging and display system of the present invention, and are thus limited in their functionality when it comes to specific applications, such as, for example, presence detection.

Still another advantage of the present invention is that it avoids the high expense of existing advanced 3D imaging cameras, which are relatively expensive and therefore not ready for deployment in consumer applications, whereas the present invention is uniquely suited for such uses.

Yet another important advantage of the present invention is that it valuably supports and services the historical trend of reducing costs, simplifying systems, and increasing performance.

These and other valuable aspects of the present invention consequently further the state of the technology to at least the next level.

Thus, it has been discovered that the three-dimensional imaging and display system of the present invention furnishes important and heretofore unknown and unavailable solutions, capabilities, and functional advantages for capturing, responding to, and/or displaying objects in a 3D volume or space. The resulting configurations and implementations are straightforward, cost-effective, uncomplicated, highly versatile and effective, can be implemented for the most part by adapting known technologies, and are thus readily suited for efficiently and economically manufacturing 3D imaging and display systems in forms fully compatible with conventional manufacturing processes and technologies, as well as existing and future devices with which the 3D imaging and display systems may be interfaced.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations which fall within the scope of the included claims. All matters hitherto set forth herein or shown in the accompanying drawings are to be interpreted in an illustrative and non-limiting sense.

The invention claimed is:

1. A three-dimensional imaging and display system comprising:
    a mobile device having a processor;
    optical detection circuitry coupled to the processor and configured to optically detect input in an imaging volume; and
    parallax compensation circuitry coupled to the processor and configured to compensate for parallax in the optically detected input, wherein the parallax compensation circuitry compensates for parallax as a function of a scan coordinate defined by a mirror system position and at least the measured distance from the mirror system to a target object; and
    display circuitry coupled to the processor and configured to present visual image feedback concerning the detected input.

2. The three-dimensional imaging and display system of claim 1, wherein the optical detection circuitry and display circuitry are configured to provide a virtual keyboard for the mobile device.

3. The three-dimensional imaging and display system of claim 1, wherein the processor is configured to perform different functions based at least in part on a type of object determined to be the target object.

4. The three-dimensional imaging and display system of claim 1, wherein the mobile device comprises a bar code reader.

5. The three-dimensional imaging and display system of claim 1, wherein the mobile device comprises a personal data assistant.

6. The three-dimensional imaging and display system of claim 1, wherein the parallax compensation circuitry is configured to compensate for parallax by calibrating to compensate for parallax by storing previously determined parallax compensation calibration information in a lookup table.

7. A method for providing a display for a mobile device comprising:
    optically detecting an input in an imaging volume for a mobile device;
    compensating for parallax in the optically detected input as a function of a scan coordinate defined by a mirror system position and a measured distance from the mirror system to a target object; and
    presenting visual image feedback as an auxiliary display for the mobile device, wherein the visual image feedback is based at least in part on the optically detected input.

8. The method of claim 7, comprising:
    calibrating for parallax; and
    populating a lookup table with calibration factors determined during the calibration, wherein the lookup table has information relating to one or more prior parallax compensation.

9. The method of claim 7, wherein compensating for parallax comprises:
    adjusting a deflection angle $(\partial, \beta)$ of a scanning beam to target a first calibration position in a bottom reference plane, wherein the bottom reference plane comprises a bottom plane of the imaging volume;
    determining x0, y0, z0, and L0, where:
    the coordinate (x0, y0, z0) is the location at which the scanning beam is reflected from the first calibration position in the bottom reference plane; and
    L0 is the distance the scanning beam travels to the first calibration position in the bottom reference plane;
    saving values for x0, y0, z0, and L0 in one or more lookup tables for later retrieval;
    repeating the adjusting, determining, and saving for other deflection angles with respect to other calibration positions in the bottom reference plane;
    adjusting the deflection angle $(\partial, \beta)$ of the scanning beam to target a second calibration position in a top reference plane, wherein the top reference plane comprises a top plane of the imaging volume;
    determining x1, y1, z1, and L1, where:
    the coordinate (x1, y1, z1) is the location at which the scanning beam is reflected from the second calibration position in the top reference plane; and
    L1 is the distance the scanning beam travels to the second calibration position in the top reference plane;
    saving values for x1, y1, z1, and L1 in the one or more lookup tables for later retrieval; and with respect to other calibration positions in the top reference plane, repeating the adjusting, determining, and saving for other deflection angles.

10. The method of claim 9, wherein the first calibration position comprises a position on a planar target sheet or a location of the target object, wherein the planar target sheet or the location of the target object is located in the bottom reference plane.

11. The method of claim 8, comprising:
displaying a virtual object located in a three-dimensional imaging volume, wherein the virtual object is derived from the detected input, wherein the virtual object is displayed as a three-dimensional image,
detecting a movement of the target object; and
manipulating the virtual object in response to detected movement of the target object, wherein the manipulation of the virtual object comprises moving, scaling, or rotating the virtual object.

12. The method of claim 8, comprising displaying externally provided images.

13. The method of claim 8, wherein optically detecting comprises optically detecting with invisible light.

14. The method of claim 13, wherein the invisible light comprises infrared light.

15. The method of claim 8 comprising:
detecting elements of the input with watershed segmentation;
tracking individual and relative movements and positions of the elements of the input; and
mapping the tracked movements and positions to predetermined functions.

16. The method of claim 8, comprising:
determining that the target object is a first or second object type;
if the target object is determined to be of the first object type, performing a first function; and
if the target object is determined to be of the second object type, performing a second function.

17. The method of claim 16, wherein the first object type comprises a hand, a foot, or a head.

18. A three-dimensional imaging and display apparatus comprising: circuitry configured to:
optically detect one or more inputs in an imaging volume by measuring a path length of a modulated scanning beam as a function of a phase shift, wherein the path length of the modulated scanning beam is separately measured at a plurality of angles, wherein measuring the path length L from the phase shift Ø and the wavelength λ wherein:

$$L(V_{OUT}) = -\frac{c}{360 \cdot f_{MOD}} \cdot \arcsin\left(2 \cdot \frac{V_{OUT}}{V_M^2}\right),$$

wherein $c = \lambda \cdot f_{MOD}$, $f_{MOD}$ is a frequency of a modulated laser signal sent in the scanning beam, $V_{OUT}$ is a DC component of the modulated laser signal, $V_M$ is an amplitude voltage of the modulated laser signal without the DC component and wherein:

$$\phi = \arcsin\left(2 \cdot \frac{V_{OUT}}{V_M^2}\right);$$

and
present visual image feedback concerning the detected input as an auxiliary display for a mobile device.

19. The three-dimensional imaging and display apparatus of claim 18, wherein the circuitry is configured to amplitude modulate the output intensity of the modulated scanning beam.

20. The three-dimensional imaging and display apparatus of claim 18, wherein the circuitry is configured to optically detect the modulated scanning beam with a PIN diode detector.

* * * * *